United States Patent [19]

McMasters et al.

[11] Patent Number: 5,116,010

[45] Date of Patent: May 26, 1992

[54] VEHICULAR WEAPON SUPPORT

[75] Inventors: David A. McMasters, Los Angeles; Donald Wetzel, Arcadia, both of Calif.

[73] Assignee: Pro-Tech Design & Manufacturing, Inc., Inglewood, Calif.

[21] Appl. No.: 539,573

[22] Filed: Jun. 18, 1990

[51] Int. Cl.⁵ ................................. A47F 5/00
[52] U.S. Cl. ......................... 248/309.1; 224/311; 224/313
[58] Field of Search ............ 248/316.8, 553, 551, 248/298, 309.1; 211/64; 224/311, 315, 320, 913, 912, 42.42, 42.45 R, 313, 273

[56] References Cited

U.S. PATENT DOCUMENTS

| 2,809,002 | 10/1957 | Rudolph | 248/298 |
| 3,319,853 | 5/1967 | Wigington | 224/313 |
| 3,802,612 | 4/1974 | Smith | 211/64 X |
| 4,120,436 | 10/1978 | Burch | 224/311 |
| 4,449,314 | 5/1984 | Sorensen | 211/64 X |
| 4,852,780 | 8/1989 | Woodbury | 211/64 X |

Primary Examiner—Carl D. Friedman
Assistant Examiner—Korie H. Chan
Attorney, Agent, or Firm—Robert J. Schaap

[57] ABSTRACT

A firearm support rack for use in the passenger compartment of automotive vehicles and which is specifically design to retain firearms have elongate barrels such as rifles and shotguns. The firearms support rack is comprised of a pair of frame sections, one of which is telescopically arranged with respect to the other so that the frame can achieve a selected length to conform to the width of the passenger compartment of the automotive vehicle. A barrel supporting assembly is located on one of the frame sections and a stock supporting assembly is located on the other of the frame sections. The two assemblies are adjustably positionable on the respective frame sections so as to accommodate different sized and types of firearms.

10 Claims, 5 Drawing Sheets

VEHICULAR WEAPON SUPPORT

BACKGROUND OF THE INVENTION

1. Field of the Invention

This invention relates in general to certain new and useful improvements in vehicular weapons supports, and more particularly, to a gun and rifle support rack used in the passenger compartments of automotive vehicles.

2. Brief Description of the Prior Art

Gun and rifle support racks are frequently used in the vehicles of peace officers for supporting shot guns, rifles and like assault weapons. There are critical requirements with respect to the use of these gun and rifle support racks, which are typically referred to as "gun support racks". First of all, a single gun support rack must be constructed so that it is adapted to fit within the passenger compartments of large numbers of vehicles in order to avoid a multiplicity of different sizes or styles of gun support racks.

Another requirement for a suitable gun support rack is that it must be capable of accommodating different sized guns or rifles. Here again, this is a desirable feature in order to eliminate a multiplicity of different sizes of gun support racks for different sized guns or rifles, that is, rifles or guns having different barrel lengths or different stock sizes.

It is also desirable to have a gun support rack in which the gun or rifle can be quickly and easily removed from the support rack in the event of an eminent danger or immediate need for use of the weapon. Clearly, any delay in removing the gun or rifle could place the peace officer in a serious or critically dangerous situation, or otherwise it could preclude proper pursuit or capture of a criminal suspect or wanted individual.

Closely coupled with the need for quick and easy removal of a weapon from the support rack is the need for security of the weapon while stored in the support rack. There must be some positive locking mechanism which secures the weapon within the support rack when the peace officer temporarily leaves his or her vehicle, but which is nevertheless capable of being rapidly opened for authorized removal of the weapon by the peace officer.

In many cases, the peace officer may require use of the gun or rifle even while the vehicle is moving. Thus, the peace officer may literally be driving the vehicle with one hand on the steering wheel and may attempt to remove the gun or rifle from the support rack with the other hand. Accordingly, there is a need for a vehicle support rack capable of storing guns and rifles and in which the peace officer or other user of the rack can quickly and immediately remove the weapon from the support rack even during movement of the vehicle.

Many vehicle gun and rifle support racks are mounted adjacent to the dashboard of the vehicle and hold the rifle or shotgun in a vertically disposed position. This type of weapon support rack is undesirable in that it occupies a substantial amount of space in the passenger compartment of the vehicle. Moreover, it renders the weapon readily observable from the exterior of the vehicle, which has been found to be undesirable.

There have been proposals for vehicle gun and rifle support racks to be secured to the interior surface of the roof of the automotive vehicle. However, in view of the fat that there are a large number of differing roof configurations among the various vehicles used by peace officers, there is a concomitant requirement for an inventory of a large number of differing sized and shaped vehicle gun support racks.

Many of the commercially available gun and rifle support racks utilize an electromagnetic lock. These locks are energized and are set to be operated when the peace officer enters the vehicle and turns on the ignition. By actuation of a switch, such as a push-button switch, the lock is capable of being opened. A timing mechanism is associated with the operation of the switches such that the peace officer only has a window of time, usually eight seconds from the operation of the switch, in which to retrieve the gun or rifle. If for some reason, the peace officer is unable to remove the gun or rifle within that time frame, he or she must actuate the switch again and remove the weapon.

Heretofore, there has not been any vehicular weapon support which meets many, if not all of the requirements for a suitable gun support rack. The presently available weapon supports usually lack in one or more of these essential features.

OBJECTS OF THE INVENTION

It is, therefore, one of the primary objects of the present invention to provide a gun and rifle support rack which is capable of conforming to and which can be mounted within the passenger compartment of a number of different automotive vehicles having differing roof configurations.

It is another object of the present invention to provide a rifle and gun support rack of the type stated which is capable of releasably receiving differing guns and rifles having differing size barrels.

It is a further object of the present invention to provide a gun and rifle support rack of the type stated which is capable of receiving differing sizes of gun and rifle stocks.

It is an additional object of the present invention to provide a vehicle gun and rifle support rack of the type stated in which a gun or rifle may be securely retained in the support rack but which is easily and readily removable therefrom by a peace officer having access to a locking mechanism on the gun/rifle support rack.

It is an additional object of the present invention to provide a gun and rifle support rack of the type stated which can be constructed at a relatively low cost but which is highly effective in operation.

It is another salient object of the present invention to provide a gun and rifle support rack having a uniquely designed stock supporting assembly and a uniquely designed barrel supporting assembly which can be rapidly opened for quick removal of a weapon and which also provides for easy storage of the weapon therein.

With the above and other objects in view, my invention resides in the novel features of form, construction, arrangement and combination of parts presently described and pointed out in the claims.

SUMMARY OF THE INVENTION

A vehicle weapon support rack for holding a firearm having an elongate barrel in the passenger compartment of a vehicle. Typically, this firearm adopts the form of a rifle or a shotgun, the latter often being referred to as a "gun". Generally, the vehicle support rack is adapted to support and hold any firearm having an elongate barrel in the nature of a rifle or shotgun.

In a broad aspect, the vehicle weapon support rack comprises a main frame for attachment to an interior portion of a passenger compartment of a vehicle. In a preferred embodiment, the vehicle weapon support rack of the invention is adapted for attachment to the interior surface of the roof portion of the vehicle passenger compartment. The main frame is provided with a bracket assembly for this purpose, as hereinafter described.

The support rack of the present invention also comprises a stock supporting assembly in proximity of one of the ends of the frame for releasably supporting the stock of the firearm. In like manner, the support rack comprises a barrel supporting assembly in proximity to the opposite end of the support rack for releasably retaining a barrel of the firearm.

As indicated previously, the vehicle support rack for supporting of firearms is designed for attachment to the interior portion of the roof of an automotive vehicle. However, and as also indicated above, police departments and military units may possess numerous differing types of vehicles and numerous differing types of firearms which must be supported in those vehicles. The vehicles usually have different roof configurations and often have different widths, particularly with differing roof dimensions from vehicle to vehicle. Moreover, the firearms may vary in length depending upon the caliber and type of firearm. Further, the stock size and shape may differ from one firearm to another. The vehicle weapon support rack of the present invention is unique in that it is capable of accommodating differing types and sizes of firearms and capable of conforming to the size and surface contour of the vehicle to which it is to be mounted.

The frame is adjustably sized so as to have variable length to conform to the width of the vehicle to which it is to be attached. More particularly, the frame is shaped so as to generally conform to the width of the roof structure in the passenger compartment and is located slightly rearwardly of the driver's seat of the vehicle. The adjustability of the frame is enabled by the provision of a first frame section and a second section which is telescopically slidable with respect to the first frame section.

In a more preferred embodiment, the first frame section is provided on its opposite longitudinal edges with a pair of grooves sized to receive projections on the longitudinal edges of the second frame section. The second frame section is also provided with grooves. The grooves in each of the first and second frame sections also receive brackets at each of the opposite ends. The brackets are designed for attachment to the interior surface of the roof of the vehicle. Fastening means, such as sheet metal screws, are used to secure the bracket to the roof of the vehicle. The first frame section is adjustably positioned with respect to the second frame section so as to provide the desired overall required length for a particular vehicle.

In a further embodiment of the invention, the grooves in the first frame section are formed by longitudinally and upwardly extending projections which are somewhat V-shaped and present V-shaped interior slots. In like manner, the second frame section is also provided with longitudinally extending upwardly disposed V-shaped projections which fit within the recesses on the projections of the first frame section. Further, the brackets are similarly provided with V-shaped projections capable of sliding within the V-shaped recesses on the projections of the first and second frame sections.

For purposes of reference, the front or forwardly facing portion of the vehicle support rack will be considered that portion, e.g. the longitudinal side which faces the front of the vehicle and the rear portion of the vehicle support rack will be that longitudinal side which faces the rear of the vehicle. Thus, reference is not made to the user of the support rack in describing the rear and the front faces, but rather, reference is made to the orientation of the support rack with respect to the vehicle.

The stock supporting assembly does not open but is designed to enable the stock of a weapon to be removed therefrom when the barrel supporting assembly is opened. The barrel supporting assembly opens at one longitudinal side of the frame. In still a more preferred embodiment, the barrel supporting assembly opens forwardly on the frame of the vehicle support rack.

The barrel supporting assembly comprises a housing having a recess therein to accommodate a gun or rifle barrel. A slot communicates with this recess and opens outwardly of the housing in order to receive or to permit exit of the barrel of the gun or the rifle. A latching mechanism is adapted to extend over the slot in order to close the slot and thereby preclude removal of the barrel. The latching means is shiftable so as to be moved out of its position over the slot to thereby enable removal of the barrel. A locking means is associated with the latching mechanism to permit opening and closing thereof.

The stock supporting assembly comprises a housing having a first finger projecting downwardly on one side thereof and which is sized and shaped to engage an upper or lower edge of the stock of a firearm. Further, the stock supporting assembly comprises a second finger on the housing projecting downwardly therefrom and spaced apart from the first finger. The second finger is also sized and shaped to engage the other of the upper or lower edge of the stock of the firearm. Means is associated with one of the fingers to enable movement of that finger relative to the other. n this way, when the stock supporting assembly is first adjusted so as to accommodate a particular type of weapon, the second finger is adjustably positioned with respect to the first finger in order to receive a particular size and shape of stock. Thereafter, the second finger is fixed in that position relative to the first finger for that particular stock. Naturally, if another weapon is to be retained in the vehicle support rack, the second finger of the stock supporting assembly would be repositioned with respect to the first finger.

This invention possesses many other advantages and has other purposes which may be made more clearly apparent from a consideration of the forms in which it may be embodied. One of these forms is hereinafter described in the detailed description of this invention. However, it is to be understood that this detailed description is only illustrative of the principles of the invention, and is not to be taken in a limiting sense.

BRIEF DESCRIPTION OF THE DRAWINGS

Having thus described the invention in general terms, reference will now be made to the accompanying drawings (five sheets) in which:

DETAILED DESCRIPTION OF A PREFERRED EMBODIMENT

Referring now in more detail and by reference characters to the drawings which illustrate a preferred embodiment of the present invention, A designates a vehicular weapon support rack of the type which is adapted for securement to the interior of a passenger compartment of an automotive vehicle. In this case, the weapon support rack is described for use in connection with automotive vehicles. However, it should be understood that the term vehicle is used in a broad sense to include a variety of vehicle types including airplanes, boats, trucks and the like. However, in the most preferred embodiment, the vehicle weapon support rack is designed for attachment to the interior surface of the roof of the passenger compartment forming part of an automotive vehicle.

Further, one of the important features of the weapon support rack of the present invention is that it must be capable of mounting to a variety of different configurations and sizes of roof structures. Moreover, it must be capable of holding guns and rifles having differing stock sizes and differing barrel lengths. As a simple example, the support rack must be designed to conveniently retain "sawed-off" shot guns, that is, shot guns having a short barrel length as well as assault rifles having a very long barrel length.

The vehicular weapon support rack of the present invention is comprised of a main frame 10 having an outer frame section 12 or so-called "outer frame" and a second frame section 14 or so-called "inner frame" section. The outer frame section 12 and the inner frame section 14 are similar in construction such that the inner frame section 14 is designed to be telescopically located with respect to the outer frame section 12.

Figure 4:
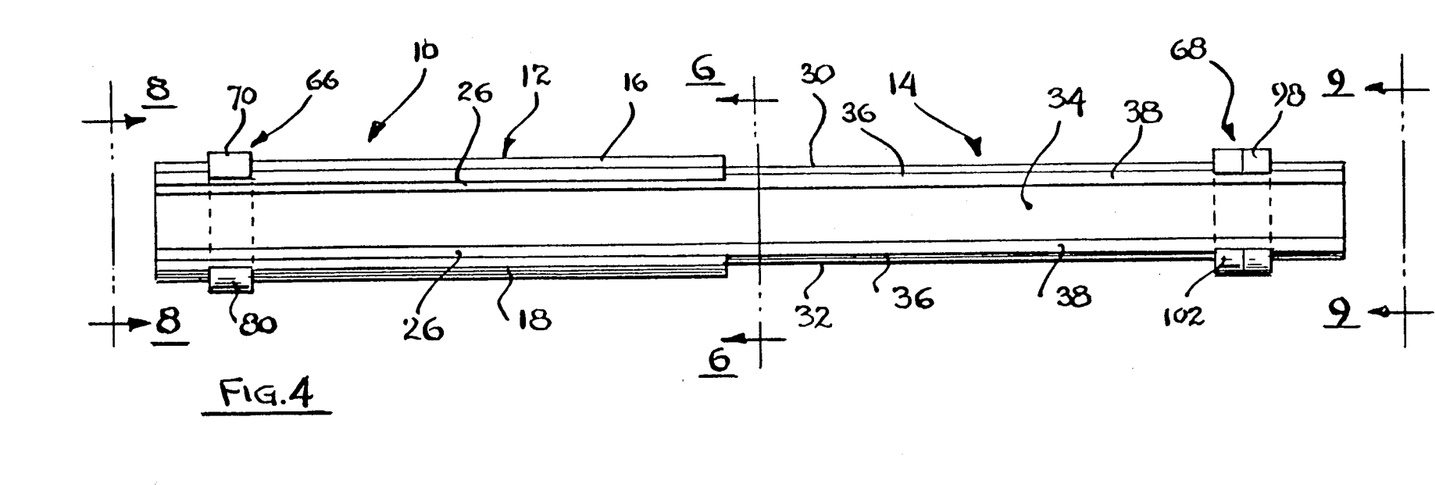
FIG. 4 is a top plan view of the vehicle firearm support rack.
Figure 5:
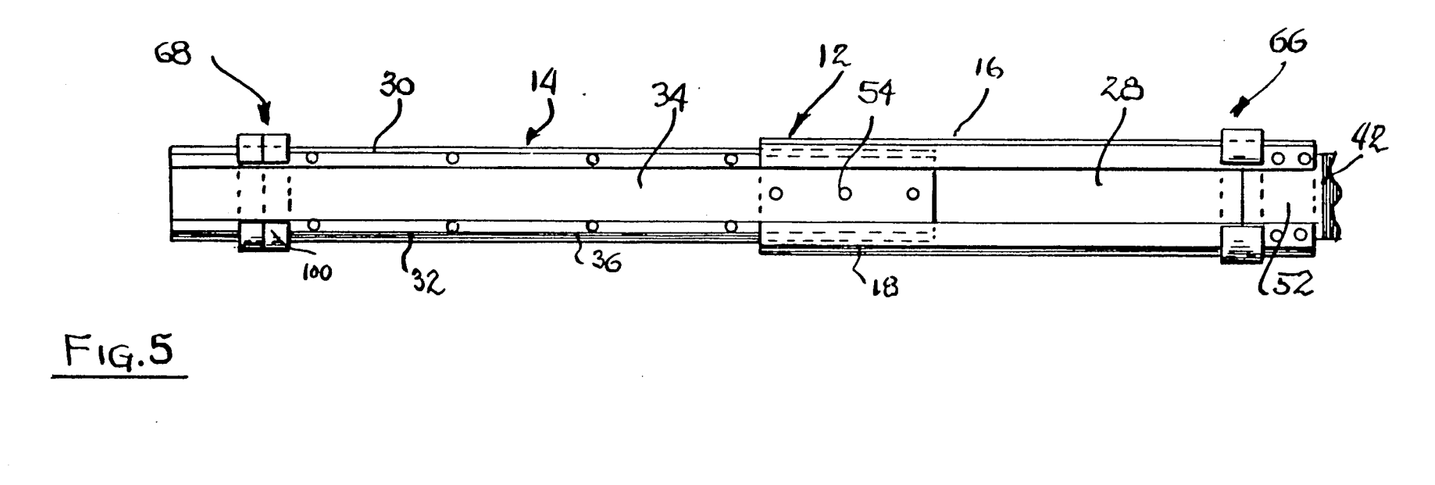
FIG. 5 is a bottom plan view of the vehicle firearm support rack of the present invention.

The outer frame section 12 is comprised of a pair of spaced apart rails 16 and 18 and each of which have somewhat V-shaped channels 20 and 22 formed therein. It can be seen that each of the rails 16 and 18 are formed by V-shaped plates 24 which thereby form the somewhat V-shaped channels 20 and 22, and which have a pair of horizontally disposed tabs 26 on the free ends thereof. The two rails are connected by a main horizontally disposed plate 28, as best seen in FIG. 4.

The inner frame 14 is similarly comprised of a pair of rails 30 and 32 and which are connected for their entire longitudinal dimension by an inner frame plate 34. The rails 30 and 32 are similar to the respective rails 16 and 18 and are sized and shaped so as to fit within the channels 20 and 22. By reference to FIGS. 1 and 6 of the drawings, it can be seen that the rails 30 and 32 are each comprised of a V-shaped plate 36 and each of which have a horizontally extending tab 38 along the free upper margins thereof. The lower margins of the V-shaped rails are connected by the frame plate 34.

In accordance with the construction as illustrated in FIGS. 1-4 and 6 of the drawings, it can be seen that the inner frame is slidable within the channels 20 and 22 of the outer frame and thereby telescopically located with respect to the outer frame 12. In this way, the inner frame can be telescopically extended with respect to the outer frame in order to conform to the overall width of the roof section forming part of the passenger compartment of the vehicle.

The weapon support rack of the present invention is secured to the interior surface of the roof of the vehicle with special brackets 40 which forms part of, or which are used with, the support rack of the present invention. A separate bracket 40 is used with each of the frame sections 12 and 14 and one bracket is secured to one of the frame sections 12 and another bracket is secured to the other of frame sections 14. One such bracket is more fully illustrated in FIG. 7 of the drawings and which also illustrates its relationship with respect to one of the frame sections.

Figure 7:
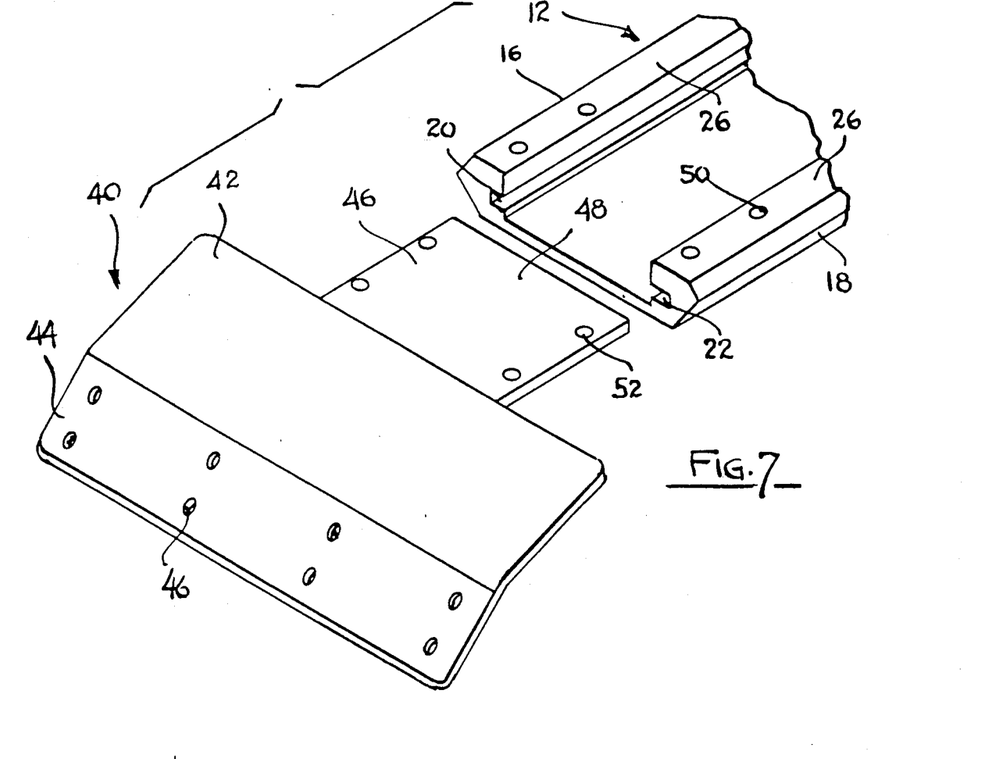
FIG. 7 is a fragmentary perspective view of a portion of the mounting bracket used in and forming part of the vehicle firearm support rack.

Referring now to FIG. 7, it can be observed that each bracket 40 is comprised of a main plate 42 having a downwardly and angularly struck plate section 44, the latter of which is adapted to engage against the interior portion of the roof structure of an automotive vehicle. In this case, it should be understood that in most automotive vehicles, the roof structure is somewhat domed shaped and has somewhat arcuately shaped outwardly extending side wall sections. This plate section 44 is adapted to engage against one of those downwardly extending side wall sections. In addition, the plate section 44 is provided with apertures 46 in order to receive conventional mechanical fasteners, such as sheet metal screws. In this way, the bracket can be mounted to the roof structure of the automotive vehicle. When both such brackets are mounted, they will support the main frame 10 in a mounted position within the automotive vehicle.

Each of the brackets 40 are also provided with tabs 48 and which are sized to extend within the channels of one of the frame sections. In the embodiment as illustrated in FIG. 7, it can be observed that the tab 48 is sized to extend into the channels 20 and 22 of the rails 16 and 18 forming part of the outer frame 12.

The horizontally disposed tabs adjacent the end of the outer frame section 12 is provided with a plurality of mounting apertures 50 which may align with similar mounting apertures in the tab 48 on the bracket 40. In this way, the aligned apertures 50 and 52 can received suitable mechanical fasteners, such as sheet metal screws or like mechanical fasteners, and thereby retentively hold the bracket 40 to the frame section. It should be understood that a similar bracket 40 would be secured to the frame section 14 in like manner.

Figures 1, 6:
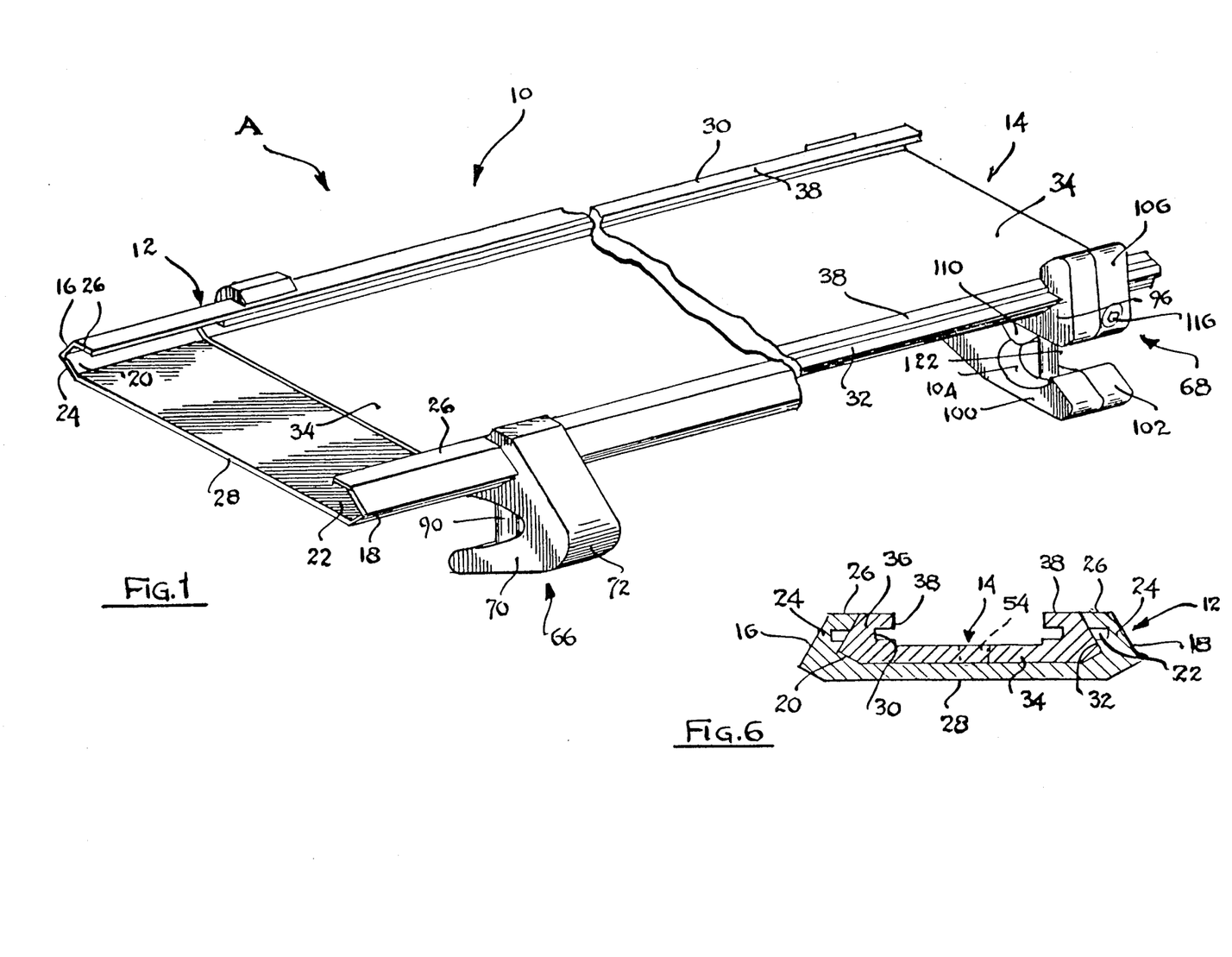
FIG. 1 is a perspective view, partially broken away, of a vehicle firearm support rack constructed in accordance with and embodying the present invention.
FIG. 6 is a vertical sectional view taken along line 6—6 of FIG. 4.
Figure 2:
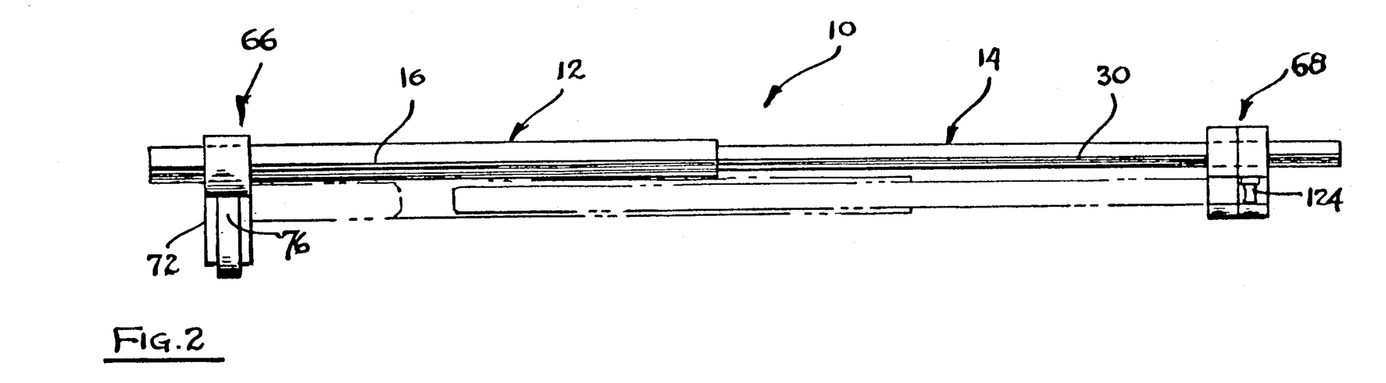
FIG. 2 is a front elevational view of the vehicle firearm support rack.
Figure 3:
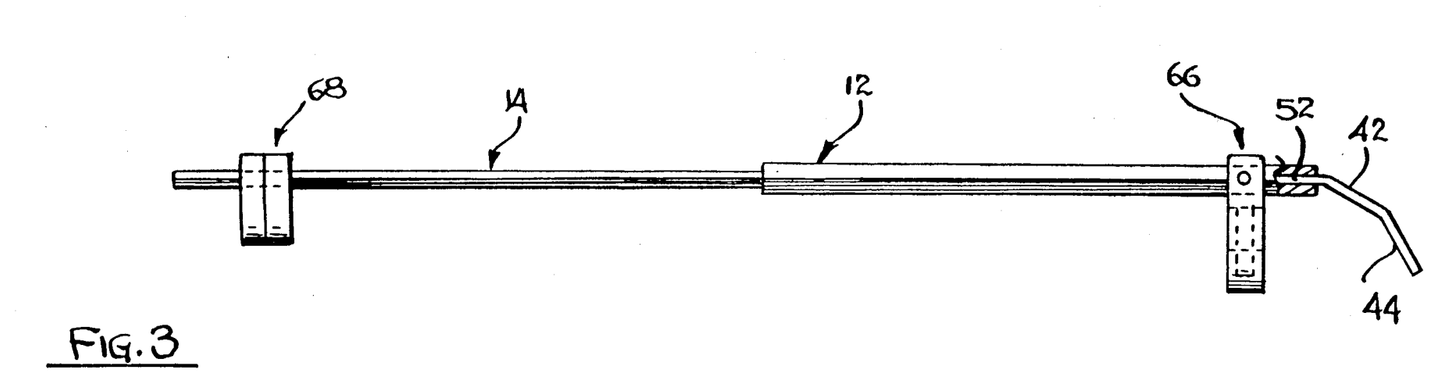
FIG. 3 is a rear elevational view of the vehicle firearm support rack.

In actual operation, the inner frame 14 is positioned with respect to the outer frame 12 to achieve a desired longitudinal dimension. Further, the inner frame may be fixed to the outer frame when in this desired positional relationship by means of mechanical fasteners such as set screws 54 or the like as shown in FIG. 6. Thereafter, the brackets 40 are located within the channels of the respective frame sections 12 and 14 and secured thereto by means of fasteners.

The weapon support rack of the present invention is also provided with a stock support assembly 66 which is more fully illustrated in FIGS. 1 and 9-12 of the drawings and a barrel supporting assembly 68 which is more fully illustrated in FIGS. 1 and 9-12 of the drawings. Typically, the barrel supporting assembly is located at one end of the inner frame 14 and the stock supporting assembly is located in proximity to the other end of the outer frame 12. The barrel supporting assembly is typically secured to one end of the inner frame section 16. However, it can be understood that it could be positioned somewhere along the length of the inner frame section 14 intermediate its ends. The stock supporting assembly is secured to the outer frame 12 intermediate its ends. The positioning of the barrel supporting assembly and the stock support assembly, along with the respective size adjustability of the main frame 10, provides a wide degree of adjustability in order to accommodate different sizes and types of fire arms in different sized vehicles.

The barrel supporting assembly is preferably arranged so that it opens to the front, e.g. forwardly opening, that is to the front of the vehicle. The stock supporting assembly 66 does not open, as aforesaid. However, when the barrel supporting assembly is open, a barrel of the firearm can be removed from the barrel supporting assembly and the stock or butt of the weapon can be easily removed from the stock supporting assembly. It has been found that this arrangement is preferred for ease of securing and removing the weapon from the stock supporting assembly and the barrel supporting assembly.

The stock supporting assembly 66 is comprised of an assembly housing 70. Moreover, this housing 70 is secured adjacent to one end of the outer frame 12, in the manner as best illustrated in FIGS. 1-5 of the drawings. In this way, it is not necessary to provide for a special means for mounting the housing 70 to the inner frame 14.

Figure 8:
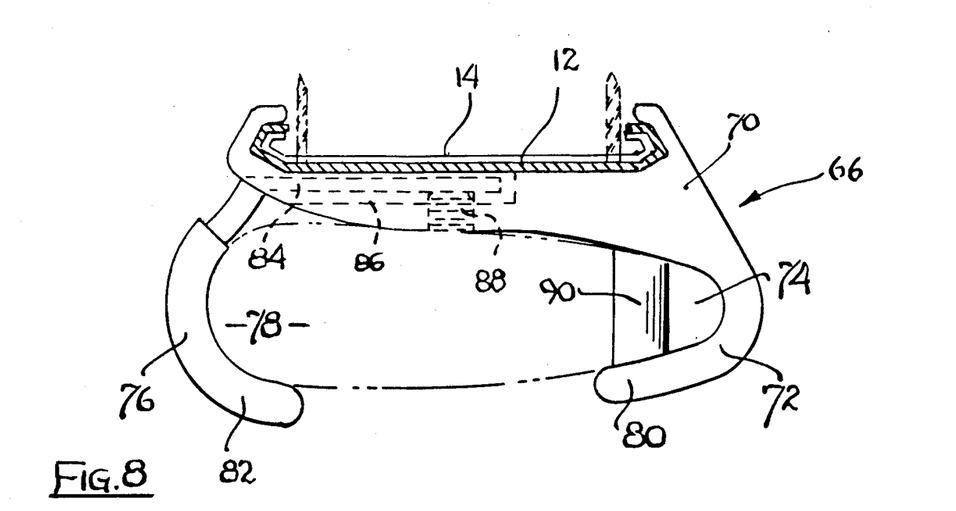
FIG. 8 is an end elevational view showing a portion of a stock supporting assembly, taken along the plane of line 8—8 of FIG. 4.

The housing 70 is comprised of a somewhat arcuately shaped downwardly and inwardly projecting finger 72 forming a groove 74 sized to receive one edge of a gun or rifle stock, such as a lower or upper edge. More specifically, the groove 74 is designed to receive the upper or lower edge of the stock which is thinner in cross section and which is typically the lower edge of the stock. Another downwardly projecting finger 76 is spaced apart from the finger 72 and is also arcuately shaped, as best illustrated in FIG. 8 of the drawings. In this case, the finger 76 forms a somewhat arcuately shaped recess 78 which is sized and shaped to receive the other of the upper or lower sides of the butt of the stock of the weapon.

The groove 74 has a somewhat more defined cross section and is somewhat smaller in the vertical dimension than the recess 78. However, both the groove 74 and the recess 78 are of a general configuration so as to accommodate the differing sizes and shapes of various gun and rifle stocks. Nevertheless, each of the fingers 72 and 76 have projecting lower ends 80 and 82 which are sufficiently close together so that they will not permit an unauthorized removal of the stock from the stock supporting assembly 66.

The finger 76 can be adjustably positioned with respect to the finger 72 so as to alter the overall transverse dimension between the fingers 72 and 76. The finger 76 is integrally formed with a horizontally located retaining plate 84 and which fits within a groove 86 formed in the housing 70. The groove 86 opens at the rearwardly facing side of the housing 70 and enables the plate 84 to be inserted therein. Thereafter, the plate 84 can be secured in a desired position within the groove 86 by means of a set screw 88. By further reference to FIG. 8, it can be seen that the set screw 88 can be tightened only from the lower surface of the housing 70. It can be observed that if the butt or the stock of a firearm is located within the stock supporting assembly, then access to the set screw 88 cannot be obtained. In this way, there cannot be any unauthorized shifting of the finger 76. In other words, in order to re-adjust the position of the finger 76 with respect to the finger 72, it would be necessary to remove the butt of the weapon from the stock supporting assembly.

A post 90 is located on the outer most side of the housing 70 in the region of the finger 72 and particularly the lower projecting end 80 thereof. The post 90 is located so as to engage the rear edge or so-called "butt" of the stock of the weapon and thereby preclude any undesired longitudinal shifting movement of the weapon when stored in the weapon support rack.

The barrel supporting assembly 68 is more fully illustrated in FIGS. 9-12 of the drawing and also comprises a housing 96 which may be secured to the outer end of the inner frame 14. The housing 96 is integrally provided with a downwardly projecting somewhat vertically arranged leg 98 which integrally merges into a somewhat horizontally disposed arm 100. In this case, the arm would be (forwardly) projecting in the embodiment as illustrated. The arm 100 integrally merges into a somewhat upwardly projected hook 102 forming a recess or trough 104 between the leg 98 and the hook 102.

Figure 9:
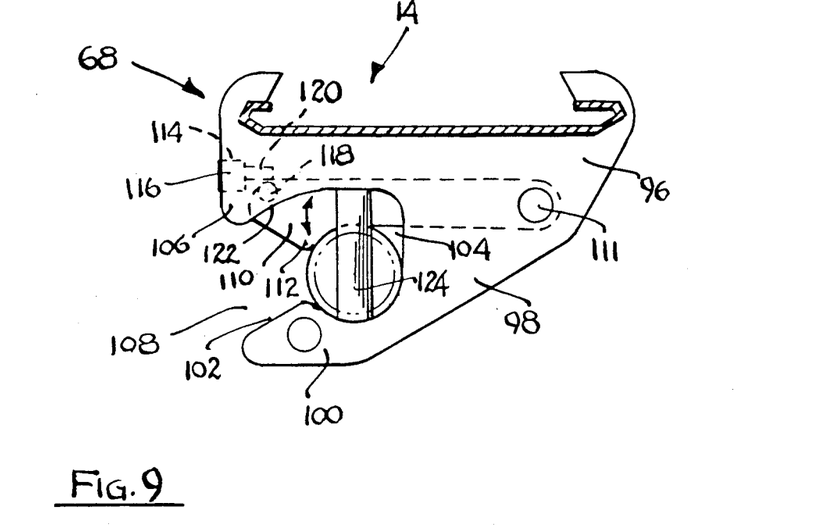
FIG. 9 is an end elevational view showing a barrel supporting assembly forming part of the vehicle firearm support rack and taken substantially along the plane of line 9—9 of FIG. 4.

The housing 96 also has a somewhat downwardly extending projection 106 which is spaced on the opposite side thereof with respect to the hook 102. However, this projection 106 is spaced from the upper edge of the hook 102, thereby defining an entrance or opening 108 leading into the recess 104. In this case, the entrance 108 is considerably smaller than the recess 104, but is sufficiently large in order to accommodate the size of a gun or rifle barrel.

An arcuately pivoted plate 110, in the form of a locking element, is also located to extend over the entrance 108, in the manner as best illustrated in FIG. 9 of the drawings. The pivot point 111 of the locking plate 110 is sufficiently displaced from the opening 108 so that there is, in effect a vertical shifting movement of the locking plate 110. The locking plate 110 has a downwardly extending tongue 112 in the region of the entrance 108 in order to preclude any possibility of unauthorized shifting of a gun or rifle barrel out of the recess 104.

The locking plate 110 is capable of being shifted upwardly about its pivot axis so as to allow sufficient clearance for removal of a gun or rifle barrel from the recess 104. In like manner, it is capable of being lowered to the position as illustrated in FIG. 9 in order to completely lock the barrel therein. A key-operated lock device 114 is located within a portion of the housing 96 and has a key access opening 116 on an exterior surface of the housing 96.

Figure 10:
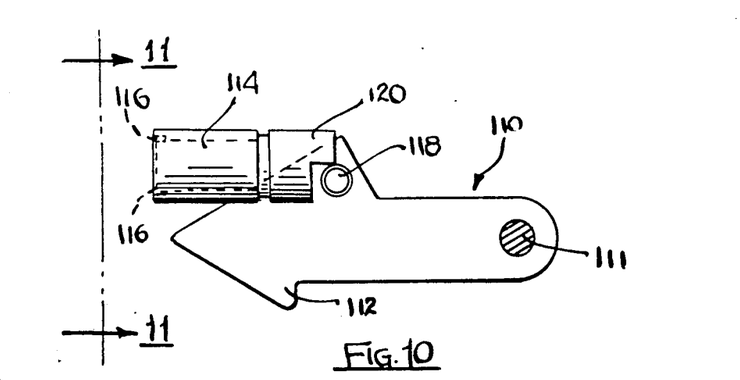
FIG. 10 is a side elevational view showing a portion of the locking mechanism used in the barrel supporting assembly of FIG. 9.
Figure 11:
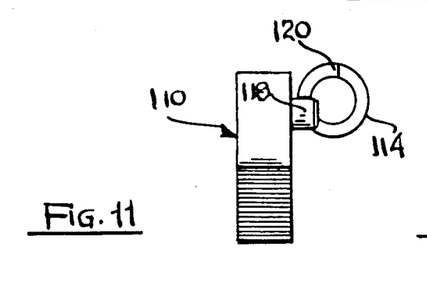
FIG. 11 is an end elevational view showing a portion of the locking mechanism and taken substantially along the plane of line 11—11 of FIG. 10.
Figure 12:
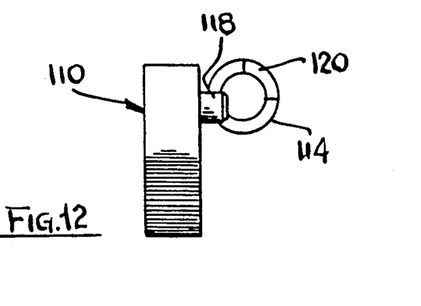
FIG. 12 is an end elevational view similar to FIG. 10 and showing the locking mechanism in an open position.

The lock device and the locking plate 110 form part of a locking mechanism and the action of this locking mechanism is more fully illustrated in FIGS. 10-12 of the drawings. In this case, it can be observed that the locking plate 110 has an outwardly projected pin 118. The key operated lock device 114 is provided with an arcuately shaped projected flange 120. In effect, the lock device 114 is essentially capable of either being rotated or having a mechanism connected to the flange 120 which enables the latter to be rotated.

When the lock device 114 is in the locked position, the flange 120 will be in the position as illustrated in FIG. 10 and 11 of the drawings. In this way, it can be observed that upward movement of the locking plate 110 about the pivot point 111 is precluded since the locking pin 118 will engage against the arcuately flange 120. However, when the lock device is turned through the action of the key, the arcuately shaped locking flange 120 will be located in the position as illustrated in FIG. 12. When in this position, it can be observed that the locking pin 118 is capable of being raised and hence, the locking plate 110 can be raised through pivoting action about the pivot point 111. Thus, FIG. 11 represents the locked position of the locking mechanism and FIG. 12 represents the unlocked position of the locking mechanism.

In accordance with the above identified construction, it can be observed that authorized personnel, such as a peace officer, can easily remove a weapon from the weapon support by opening of the lock mechanism. In this way, the officer merely raises the barrel causing the locking plate 110 to move upwardly and the tongue 112 to move out of any interfering position. The stock may then be removed from the stock supporting assembly 66 by merely sliding the same out of the fingers 72 and 76. When it is desired to secure the weapon within the support rack, the stock is inserted into a position between the two fingers 72 and 76 of the stock supporting assembly until the butt of the stock abuts against the post 90. Thereafter the end of the barrel is inserted into the entrance 108 and into the recess 104. When the barrel is disposed in the recess 104, the lock mechanism 114 can be locked to thereby secure the weapon in its position.

It can be seen that the locking plate 110 has an arcuately shaped camming surface 122 facing the entrance or opening 108. In this way, when the barrel is forced against the camming surface 122, it will cause an upward movement of the locking plate 110 thereby allowing the barrel to move into the recess 104. Furthermore, the barrel supporting assembly 68 is also provided with a vertically disposed post 124 which also precludes any longitudinal shifting movement of the barrel. It can be observed that in absence of the post 124, the barrel could be shifted so that the end thereof extends beyond the barrel supporting assembly 68 by a distance sufficient to remove the stock from the stock supporting assembly 66. However, the combination of the vertically disposed posts 90 and 124 precludes any longitudinal shifting movement. Thus, when the lock device 114 is locked, the gun or rifle cannot be removed from the support rack.

It can be seen that any type of lock could be used in place of the lock device 114. A combination lock device or a magnetic key lock device or the like could be used. Furthermore, an electronically operated push button pad for controlling a lock mechanism could be employed. However, the key operated locking device 114 has been found to be preferable for ease, reliability and ready access.

Thus, there has been illustrated and described a unique and novel gun and rifle support assembly which permits attachment to a vehicle with conformance to the surface contour and size of the vehicle and which is thereby highly effective in operation and which also provides for a stock supporting assembly and a unique barrel supporting assembly. Thus, the gun and rifle support rack of the present invention fulfills all of the objects and advantages which have been sought therefore. It should be understood that many changes, modifications, variations and other uses and applications will become apparent to those skilled in the art after considering this specification and accompanying drawings. Therefore, any and all such changes, modifications, variations and other uses and applications which do not depart from the spirit and scope of the invention are deemed to be covered by the invention.

Having thus described my invention, what I desire to claim and secure by letters patent is:

1. A vehicle support rack for holding an arm supported firearm having a stock and an elongated barrel in the passenger compartment of a vehicle, said support rack comprising:

a) a main frame for attachment to an interior portion of a passenger compartment of the vehicle, b) a stock supporting assembly in proximity to an end of said main frame for releasably retaining a stock of the firearm, c) a barrel supporting assembly in proximity to another end of said main frame for releasably retaining the barrel of the firearm, d) locking means associated with said barrel supporting assembly or stock supporting assembly for locking said barrel or stock in said supporting assembly in such manner to prevent unauthorized removal therefrom, e) restraining means associated with the other of the barrel supporting assembly or stock supporting assembly to preclude the firearm being removed from the barrel supporting assembly and the stock supporting assembly when the locking means is locked, f) adjusting means associated with said main frame to enable said main frame to conform to a surface contour and to be adjustably sized to become attached to a surface of any of a large number of vehicles having differing sizes and surface contours to which the support rack would be attached, said adjusting means being comprised of:

1) a first plate having grooves in the edges of the first plate, 2) a second plate slidable in the grooves of the first plate so as to be telescopically arranged with respect to the first plate, said second plate also having grooves therein, and 3) a mounting bracket for securement to a vehicle and being shiftable in the grooves of said second plate, and g) said barrel supporting assembly being comprised of:
  (1) a housing having a recess therein to accommodate a gun or rifle barrel,
  (2) said housing having a slot of reduced size relative to the recess and communicating with the recess to receive the barrel,
  (3) a latching mechanism extending over said slot to close the same and preclude removal of the barrel, and
  (4) said locking is means associated with the latching mechanism to permit opening and closing thereof.

2. The vehicle support rack of claim 1 further characterized in that the grooves in the first plate are V-shaped and longitudinal edges of said second plate are V-shaped.

3. The vehicle support rack of claim 1 further characterized in that the barrel supporting assembly opens at one longitudinal side of the frame and the stock supporting assembly opens at the opposite longitudinal side thereof.

4. A vehicle support rack for holding an arm supported firearm having a stock and an elongate barrel on the interior surface of the roof of a vehicle, said support rack comprising:

a) an outer frame having a pair of spaced apart longitudinally extending rails, said longitudinally extending rails having recesses formed therein;

b) an inner frame also having a pair of spaced apart longitudinally extending rails, said inner frame rails having an exterior size and shape to fit within the recesses of the outer frame rails so that the inner frame is telescopically extensible with respect to the outer frame to thereby conform to the size of the interior surface of the vehicle roof;

c) fastener means engageable from the upper surface of said inner frame to lock the inner frame to the outer frame in a selected position;

d) bracket means for securing the inner frame to the interior surface of the roof of a vehicle, said bracket means precluding access to the fastener means when the bracket means is secured to the roof of the vehicle;

e) a stock supporting assembly in proximity to an end of one of said frames for releasably retaining a stock of the firearm, f) a barrel supporting assembly in proximity to an opposite end of the other of said frames for releasably retaining the barrel of the firearm, and said barrel supporting assembly being comprised of:
  (1) a housing having a recess therein to accommodate a gun or rifle barrel,
  (2) said housing having a slot of reduced size relative to the recess and communicating with the recess to receive the barrel,
  (3) a latching mechanism extending over said slot to close same and preclude removal of the barrel, and
  (4) locking means associated with said latching mechanism to prevent opening and closing thereof.

5. The vehicle support rack of claim 4 further characterized in that said rails of said inner frame have a pair of recesses therein, and said bracket means has a pair of longitudinally extending spaced apart rails which extend into the recesses of said rails of said inner frame.

6. The vehicle support rack of claim 4 further characterized in that the stock support assembly comprises a first finger projecting downwardly along one side thereof and shaped to engage an upper or lower edge of a stock and a second finger spaced apart from the first finger and projecting downwardly and shaped to engage the other of the upper or lower edges of the stock, and means enabling movement of one of the fingers relative to the other.

7. A vehicle support rack for holding an arm supported firearm having a stock and an elongated barrel in the passenger compartment of a vehicle, said support rack comprising:

a) a main frame for attachment to an interior portion of a passenger compartment of a vehicle;

b) a barrel supporting assembly comprising:
  1) a housing having a recess therein to accommodate a gun or rifle barrel and a slot of reduced size relative to the recess and communicating with the recess to receive the barrel;
  2) a latching mechanism extending over said slot to close same and preclude removal of the barrel, and
  3) locking means associated with latching mechanism to permit opening and closing thereof;

c) a stock support assembly comprising:
  1) a first finger projecting downwardly along one side thereof and shaped to engage an upper or lower edge of a stock;
  2) a second finger spaced apart from the first finger and projecting downwardly and shaped to engage either of the upper or lower edge of the stock; and
  3) means enabling movement of one of the fingers relative to the other.

8. The vehicle support rack of claim 7 further characterized in that the adjusting means associated with said main frame to enable adjustment of the overall size thereof provides for adjustment of the length of the main frame.

9. A vehicle support rack for holding an arm supported firearm having an elongated barrel in the passenger compartment of a vehicle, said support rack comprising:

a) a main frame for attachment to an interior portion of a passenger compartment of a vehicle;

b) adjusting means associated with said main frame to enable said frame to be adjustably sized to become attached to a surface of any of a large number of vehicles having differing sizes and surface contours to which the support rack could be attached; and c) a barrel supporting assembly comprising: gun or rifle barrel and a slot of reduced size relative to the recess and communicating with the recess to receive the barrel;
  2) a latching mechanism extending over said slot to close the same and preclude removal of the barrel, and
  3) locking means associated with latching mechanism to permit opening and closing thereof;

d) a stock support assembly comprising:
  1) a first finger projecting downwardly along one side thereof and shaped to engage an upper or lower edge of a stock;
  2) a second finger spaced apart from the first finger and projecting downwardly and shaped to engage either of the upper or lower edge of the stock; and 3) means enabling movement of one of the fingers relative to the other.

10. A vehicle support rack for holding an arm supported firearm having a stock and an elongated barrel in the passenger compartment of a vehicle, said support rack comprising:

a) a main frame for attachment to an interior portion of a passenger compartment of the vehicle, b) a stock supporting assembly in proximity to an end of said main frame for releasably retaining a stock of the firearm, c) a barrel supporting assembly in proximity to another end of said main frame for releasably retaining the barrel of the firearm, d) locking means associated with said barrel supporting assembly or stock supporting assembly for locking said barrel or stock in said supporting assembly in such manner to prevent unauthorized removal therefrom, e) restraining means associated with the other of the barrel supporting assembly or stock supporting assembly to preclude the firearm being removed from the barrel supporting assembly and the stock supporting assembly when the locking means is locked, f) adjusting means associated with said main frame to enable said main frame to conform to a surface contour and to be adjustably sized to become attached to a surface of any of a large number of vehicles having differing sizes and surface contours to which the support rack would be attached, g) said barrel supporting assembly being comprised of:
(1) a housing having a recess therein to accommodate a gun or rifle barrel,
(2) said housing having a slot of reduced size relative to the recess and communicating with the recess to receive the barrel,
(3) a latching mechanism extending over said slot to close the same and preclude removal of the barrel, and
(4) said locking is means associated with the latching mechanism to permit opening and closing thereof, h) said stock supporting assembly being comprised of:
(1) a first finger projecting downwardly along one side thereof and shaped to engage an upper or lower edge of a stock,
(2) a second finger in general alignment with and spaced apart from the first finger and projecting downwardly and shaped to engage the other of the upper or lower edge of the stock, said second finger being on an opposite side of the stock with respect to the first finger when a stock is supported in the stock support assembly, and
(3) means enabling movement of one of the fingers relative to the other to permit retention of the stock when the fingers are in a first or closed position and removal of the stock when one of the fingers is shifted so that the fingers are in a second or open position.

* * * * *